March 3, 1964 D. J. LOGAN 3,123,705
WELD BACKUP BAR AND MEANS FOR ASSURING
COMPLETE WELD JOINT PENETRATION
Filed July 10, 1961 4 Sheets-Sheet 1
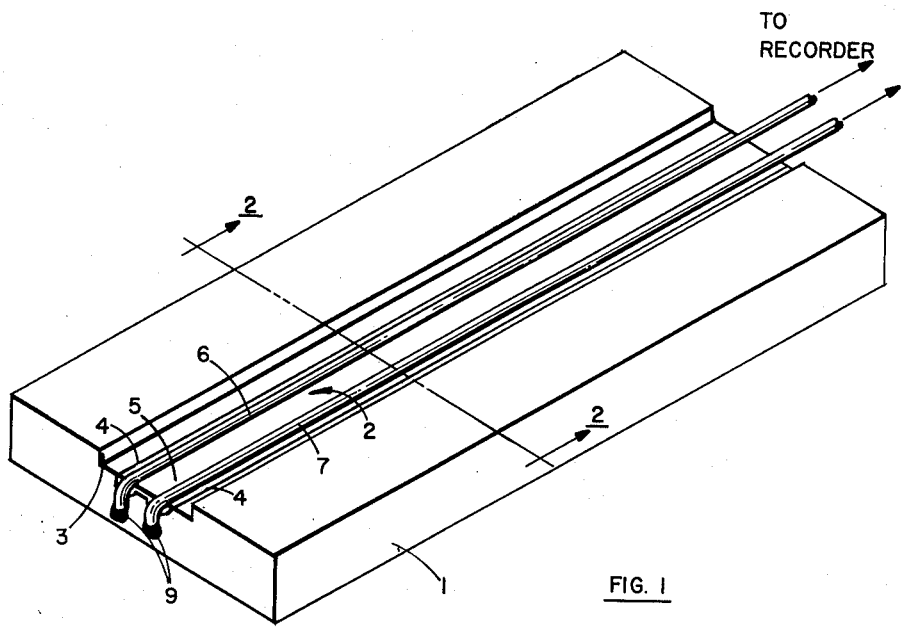
FIG. I
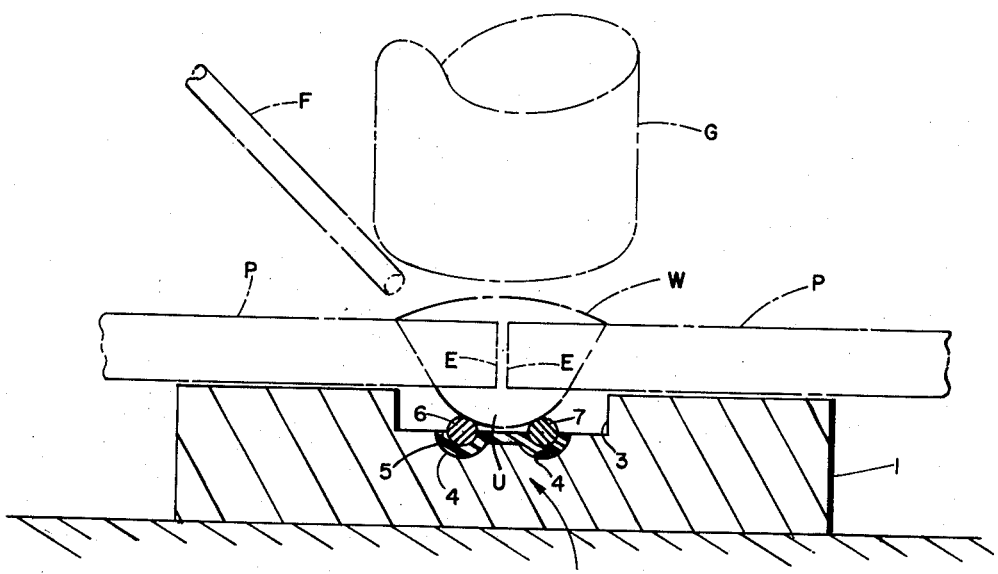
FIG. 2
INVENTOR.
DEXTER J. LOGAN
BY Thomas S. MacDonald
ATTORNEY March 3, 1964

D. J. LOGAN 3,123,705

WELD BACKUP BAR AND MEANS FOR ASSURING
COMPLETE WELD JOINT PENETRATION

Filed July 10, 1961

INVENTOR.
DEXTER J. LOGAN

BY Thomas S. Macdonald

ATTORNEY

March 3, 1964

D. J. LOGAN 3,123,705

WELD BACKUP BAR AND MEANS FOR ASSURING
COMPLETE WELD JOINT PENETRATION

Filed July 10, 1961

TO RECORDER

INVENTOR.
DEXTER J. LOGAN

BY Thomas S. MacDonald

ATTORNEY

March 3, 1964 D. J. LOGAN 3,123,705
WELD BACKUP BAR AND MEANS FOR ASSURING
COMPLETE WELD JOINT PENETRATION
Filed July 10, 1961 4 Sheets—Sheet 4

INVENTOR.
DEXTER J. LOGAN
BY
Thomas S. MacDonald
ATTORNEY

United States Patent Office 3,123,705
Patented Mar. 3, 1964

3,123,705
WELD BACKUP BAR AND MEANS FOR ASSURING COMPLETE WELD JOINT PENETRATION
Dexter J. Logan, El Monte, Calif., assignor to North American Aviation, Inc.
Filed July 10, 1961, Ser. No. 122,689
12 Claims. (Cl. 219—131)

This invention relates to a weld backup bar and means for assuring complete weld joint penetration of a welded joint and more particularly relates to a weld backup bar and continuous thermocouple type control means operatively associated therewith for automatically providing a sufficient heat input into a welded butt joint to assure complete joint penetration and thus a sufficient weld underbead.

One of the main causes of weld rejections, particularly subsequent to the fabrication of conventional butt weld joints, is the lack of complete weld joint penetration. Such an incompleted weld joint is obviously highly susceptible to failure. Such a discrepancy may be caused, for example, by a difference in material thickness, localized chilling due to non-uniform weld backup bar or hold down bar contact, the inability of the operator to ascertain the extent of weld joint penetration during the welding operation or any combination of the above. The latter inadequacy becomes particularly apparent during welding operations wherein the operator has to weld "blindly," i.e., the welded structure is such that the operator cannot look behind it to determine whether there is a sufficient (100%) weld joint penetration.

This invention has overcome many of the inadequacies afforded by conventional welding apparatuses and techniques by providing a weld backup bar assembly including means for assuring a complete weld joint penetration. The weld backup bar assembly essentially comprises a weld backup bar adapted to support a welded member or members and a means constructed and arranged on said bar for continuously sensing and signaling the depth of weld joint penetration when said member or members are welded.

An object of this invention is to provide a weld backup bar assembly for expeditiously and accurately fabricating a high strength weld joint.

Another object of this invention is to continuously assure complete and continuous weld penetration of a weld joint.

A further object of this invention is to automatically impart sufficient heat input to a progressively formed weld joint to continuously assure a complete weld penetration thereof.

A still further object of this invention is to assure a complete weld joint penetration where the operator is indisposed to look behind the welded workpiece to determine whether such penetration has been achieved.

These and other objects of this invention will become apparent from the following description taken in connection with the accompanying drawings, in which:

FIG. 1 is a perspective view disclosing a first weld backup bar assembly embodiment employing the novel concepts of this invention;

FIG. 2 is a cross-sectional view taken on lines 2—2 in FIG. 1;

Figure 3:
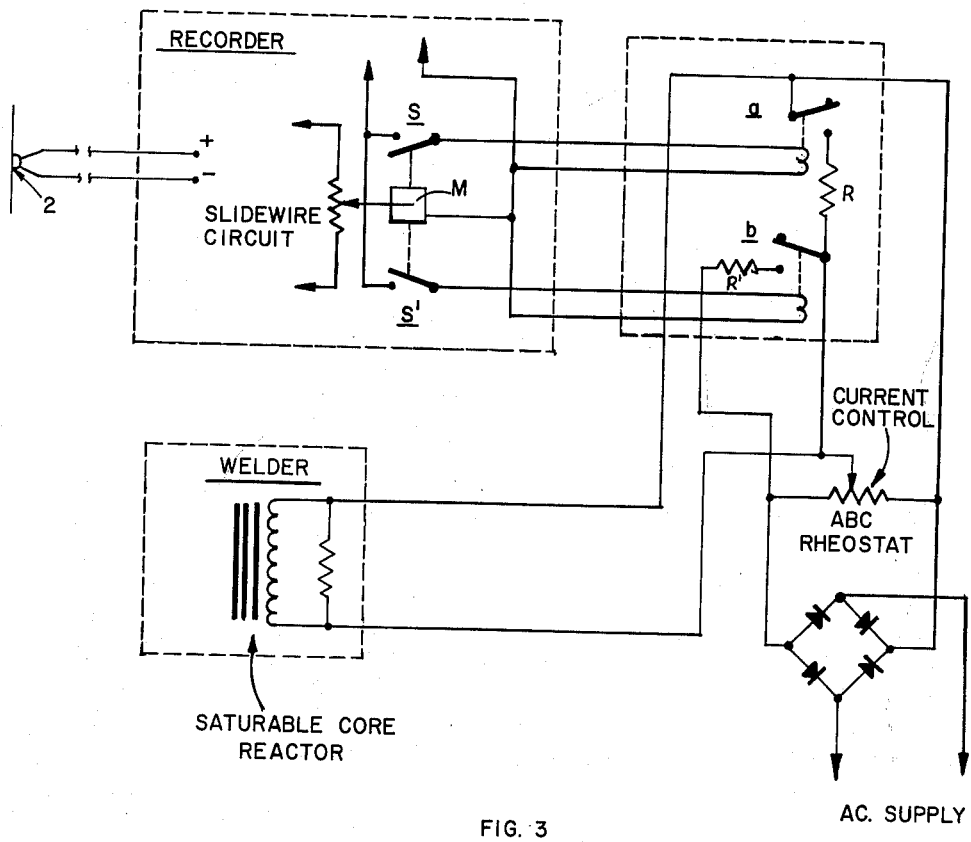
FIG. 3 is a schematic showing of a typical electrical circuit which may be conveniently utilized as a control means in combination with the herein disclosed weld backup bar assemblies to provide for continuous automatic control of a welding operation.

FIG. 1 discloses a first preferred weld backup bar assembly embodiment employing the novel concepts for this invention. The assembly essentially comprises a weld backup bar 1 and a continuous thermocouple generally noted at 2. The weld backup bar 1 may comprise any standard material which is capable of withstanding the extreme welding temperatures to which it may be subjected while yet maintaining the desired structural support for the welded workpieces. For example, when the welding temperatures reach 1400° F. the weld backup bar material may comprise a standard aluminum alloy (one selected from the No. 7075 series, for example), a stainless steel alloy (one selected from the Nos. 301 or 304 series, for example) or a standard "mild" steel. For higher temperatures, such as those in the range of 1400°–3100° F., for example, copper or a standard copper alloy may be conveniently used therefor.

As more clearly shown in the cross-sectional view of FIG. 2, the weld backup bar 1 essentially comprises a cutout portion 3 formed on a selected surface or periphery thereof, said cutout portion having two longitudinally extending grooves 4 formed on the base portion thereof. As shown, the cutout portion 3 has a predetermined length and extends in a predetermined direction on said surface. An insulative means 5 is constructed and arranged in the grooves 4 by conventional bonding techniques for purposes hereinafter more fully explained. The particular constituent utilized and the particular construction and arrangement of the insulative means 5 depends on the specific work application. For most work applications it is desirable to select a constituent which maintains the desired thermal and electrical insulative properties and will not decompose at elevated welding temperatures in the range of 3100° F., for example. Many ceramic based insulative type materials, for example, have proven adequate for such application. Examples of such insulative materials (alumina, zirconia, silica based constituents, etc.) are taught in U.S. Patent No. 2,707,671 to W. M. Wheldon, Jr., dated May 3, 1955. This patent further illustrates typical bonding techniques which may be conveniently ultilized to bond such materials to the herein disclosed weld backup bar. The insulative means 5 may comprise any desired thickness also depending on the particular work application requirements. For example, a thickness approximating 0.001 inch would be sufficient for most applications.

Two juxtaposed thermocouple members 6 and 7 are constructed and arranged in the longitudinally extending grooves 4 and are secured at a first end thereof to the weld backup bar 1 by means of standard spot weldments 9 (FIG. 1). The thermocouple members may comprise any standard materials which are thermally, electrically and structurally compatible pursuant to a specific set of weld backup bar assembly design requirements. For example, an iron and constantan combination may be conveniently utilized therefor, for welding operations carried forth in the range of 1400° F. while a platinum and platinum-rhodium alloy combination may be successfully used in welding temperature environments in the range of 3100° F. The insulative means 5 is constructed and arranged between the thermocouple members 6 and 7 and the weld backup bar 1 as more clearly shown in FIG. 2.

The cross-sectional configuration of the thermocouple members 6 and 7 may comprise any desired configuration such as round, rectangular, etc. For exemplary purposes the thermocouple elements have been shown as substantially circular in cross-section. The specific diameter and separation distance between the two elements comprises a matter of choice depending on the specific design requirements under consideration. One design desideratum which is preferably utilized for all of the herein described embodiments is that the thermocouple elements be constructed and arranged to laterally extend into the cavity formed by the cutout portion 3. Such a construction and arrangement is generally desired to assure sufficient weld underbead contact thereat, as will be hereinafter more fully explained. For example, for illustration purposes the thermocouple members 6 and 7 of FIG. 2 are shown as constructed and arranged so that their respective diameters are substantially flush relative to the base portion of the cutout portion 3. Another preferable design requirement is that the thermocouple members be constructed and arranged a sufficient lateral distance from each other to prevent an electrical shorting therebetween while yet being close enough to permit sufficient weld underbead contact.

As shown by the phantom lines in FIG. 2, two workpieces P are constructed and arranged to have their respective juxtaposed edges E in substantial abutting relationship to each other so that they may be welded together by means of a selectively formed weld bead W. A standard welding gun G is also shown in phantom lines and is adapted to be progressively moved along the juxtaposed abutting edges E of the workpieces and deposit the weld bead W thereat in a conventional manner. The weld bead W may either comprise a conventional filler material F which is metallurgically compatible with the workpieces W or the workpiece material itself. It should be understood that although the novel concepts of this invention are herein expressed as being particularly adapted for the forming of continuous seam welds that one or more spot welds, for example, may also be readily formed therewith.

The present invention is obviously adapted to be utilized for the welding of both metallic and non-metallic materials. However, since the welding of metallic materials is considered to be of prime importance herein, the novel concepts of this invention will be particularly hereinafter discussed in connection therewith. Standard non-ferrous such as aluminum and magnesium based metals comprise a large portion of the presently used metals and are generally adapted to be welded at temperatures approximating 1400° F. Such non-ferrous type metals may comprise, for example, aluminum, aluminum alloys, magnesium, magnesium alloys, etc. The weld backup bar 1, the insulative means 5 and the thermocouple members 6 and 7 which were suggested as being adapted for use at temperatures approximately 1400° F. may thus be conveniently employed with such non-ferrous type metals. As also hereinbefore stated, if the particular welding method employed necessitates the use of a filler material F, such material must be metallurgically compatible with the welded workpieces P so as to assure a sound structural bond therebetween.

The present invention finds particular application when utilized for the welding together of extremely high strength type metallic workpieces both of the ferrous and non-ferrous type. For example, such high strength type workpieces may comprise an H–11 Steel or a nickel based Inconel or Monel constituent, etc. Again it should be noted that the proper filler material must be used therewith to assure the proper bonded weld joint. It may be generally said that such high strength type materials require welding temperatures in the range of 2800° F. to 3100° F. In accordance therewith, the elements comprising the weld backup bar assembly may comprise those constituents which were aforementioned as being adapted for use at such elevated temperatures.

FIG. 3 discloses an electrical circuit or control means which may be conveniently utilized for automatically controlling the progressive movements of the welding gun G (FIG. 2). A typical rate of welding gun movement comprises fifteen inches per minute. As shown, the electrical control circuit essentially comprises a recorder, a control panel and a welder. The main purpose of the control system is to utilize the continuous thermocouple signals generated by the thermocouple means 2 to automatically and efficiently deliver the desired amount of heat input to the weld area. For example, additional heat input is necessary when there is a danger of insufficient weld joint penetration and conversely such heat input must be reduced when there is the alternative danger of excessive heat input thereto. To aid in this function the peak temperature of a progressively formed weld underbead is continuously monitored by means of the continuous and relatively stationary thermocouple 2.

The following briefly explained typical welding operation and in particular the electrical circuitry used therefor is by way of illustration only and should not be construed as limiting the novel concepts of this invention. For example, other control circuits may be used in conjunction with the hereinbefore explained weld backup bar assembly for any particular welding operation.

*Method of Operation*

As shown by the phantom lines in FIG. 2, two workpieces P are constructed and arranged to have their respective juxtaposed edges E in substantial abutting relation with each other. The workpieces P are thus adapted to be welded together by means of the subsequently formed butt weld point W. The gun G comprises an operative part of the welder (FIG. 3) and is adapted to be longitudinally moved along the seam formed by the edges E of the workpieces P by either manual or structural type supporting means. For example, a conventional gun track support means (not shown) may be constructed and arranged in close proximity to the supported workpieces to permit selective sliding movements of the gun therealong. The welding gun G is preferably initially positioned, at the beginning of the welding operation, adjacent the end of the backup bar 1 whereat the thermocouple elements 6 and 7 are welded to the weld backup bar 1 (FIG. 1).

The gun is then progressively and selectively moved towards the recorder end of the backup plate at a selected speed. Such a speed is primarily dependent on the voltage which is sensed by the thermocouple 2 and relayed to the recorder pursuant to the intimate and bridging type contact made by the underbead U with the thermocouple 2 (FIG. 2). Such a weld underbead U-thermocouple 2 bridging type contact may be considered to constitute a type of shorting action which thus functions to form a thermocouple junction. Such a shorting type thermocouple action may be deemed analogous to the placing of two thermocouple members in close proximity to each other (but not in intimate contact), in a molten vat of metal. It can thus be readily seen that the temperture of the weld underbead functions to induce a voltage in the thermocouple in the conventional manner which voltage signals weld bead penetration and are automatically relayed to the recorder. Thus, a complete weld joint penetration is effected which provides a weld bead of predetermined dimensions.

The temperature control mechanism, generally indicated as the control panel, is initially set so that when the recorder registers a predetermined weld underbead temperature, a light (not shown) which is operatively connected thereto discloses to the operator that there is insufficient weld joint penetration. Thus, the operator is alerted that an immediate increase in heat input by means of the welding gun G is necessitated. When the system registers the desired welding temperature range, a second but differently colored light (not shown) may be operatively connected to the recorder and functions to assure the operator that a satisfactory underbead (and consequently 100% joint penetration) is being obtained. When a temperature in excess of that desired is registered by means of a third light (not shown), for example, the operator becomes instantly aware that an excessive heat input and weld underbead are imminent. Such an undesirable welding state obviously requires an immediate reduction of the heat input into the welding arc.

To fulfill the above stated desired functions, the recorder as schematically shown in FIG. 3 is constructed and arranged to comprise two micro-switches S and S' which may be actuated by cam means (not shown) or the like operatively attached to a driven shaft (not shown) of a standard drive mecahnism (not shown). The terminals of the thermocouple 2 may be operatively connected to an amplifier (not shown) in the recorder in the conventional manner, which amplifier may be in turn operatively connected to a drive motor M for the actuation of switches S and S'. An indication that too much heat is being applied to the weldment automatically functions to actuate switch S to thus close the circuit in order to energize relay $a$ of the control panel. This action parallels the resistance R and sections B—C of a welding current control rheostat. The resulting decrease of current at the welding arc functions to automatically decrease the rate of heat input into the weld pool, thus preventing excessive heat input at the weldment.

Conversely, when excessive copper chilling, for example, functions to indicate a temperature below that desired for welding purposes, a switch S' is automatically actuated which in turn functions to energize the coil of relay $b$ which connects the resistance R' in parallel with section A—B of the control rheostat. Thus, an increase of the welding current and also an increase of the rate of heat input into the weld pool automatically functions to provide a sufficient weld joint penetration.

Figure 4:
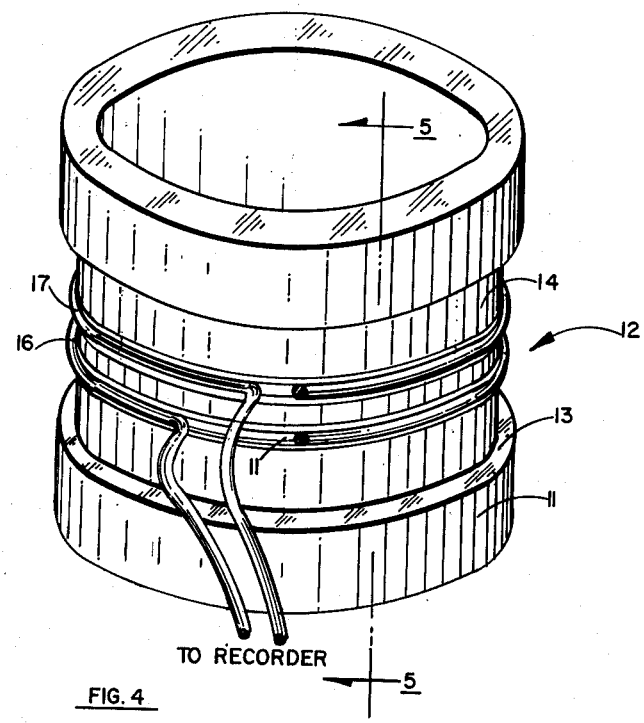
FIG. 4 is a perspective view disclosing a second weld backup bar assembly embodiment employing the novel concepts of this invention.

FIG. 4 discloses a second preferred weld backup bar assembly embodiment. The novel concepts of this invention are shown as they would appear when utilized in conjunction with a weld backup bar having a circular cross-sectional configuration. In many welding applications wherein the cross-sectional configuration of the workpiece to be welded comprises a circular or semicircular configuration it is necessary to provide supporting weld backup bar means therefor. A weld backup bar 10 is shown as comprising a substantially cylindrical configuration with a thermocouple means 12 constructed and arranged in a cutout portion 13 which is formed therein.

Figure 5:
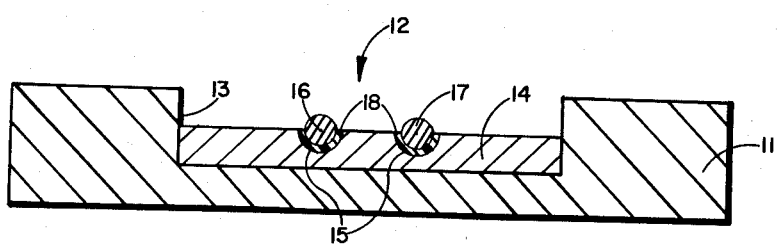
FIG. 5 is a cross-sectional view taken on line 5—5 in FIG. 4.

As more clearly shown in FIGURE 5, the cross-sectional construction and arrangement of the weld backup bar assembly comprising the second embodiment is substantially the same as that shown in FIG. 2. However, the basic difference therebetween is the utilization of an insert 14 which is primarily utilized for mechanical support of the thermocouple means 12 and provides that the entire thermocouple assembly may be expeditiously removed from the weld backup bar 11, if so desired. Depending on the particular work requirements, the insert 14 could comprise an electrical insulating constituent such as a standard Micalex board or a material identical with that constituting the weld backup bar 11, for example. Two longitudinally extending grooves 15 are formed in the insert 14 and function to retain the two thermocouple members 16 and 17 therein by means of a ceramic coating 18. The ceramic coating may be of any conventional type which will function to not only retain thermocouple elements 16 and 17 in their relative stationary positions, but will also aid in the electrical insulation function. For example, one of the ceramic coatings mentioned in connection with the insulative means 5 of FIG. 2 may be utilized therefor.

The weld backup bar assembly comprising the embodiment of FIGS. 4 and 5 may be operatively connected to a welding control means similar to that shown in FIG. 3, for example. The subsequently carried forth welding operation comprises the same as that explained in connection with FIGS. 1–3 inclusive. The construction and arrangement of the respective thermocouple members 16 and 17, whereby such members are adapted to be bridged by the formed weld bead, may comprise those design parameters which were mentioned in connection with the thermocouple members 6 and 7 of FIG. 2.

Figure 6:
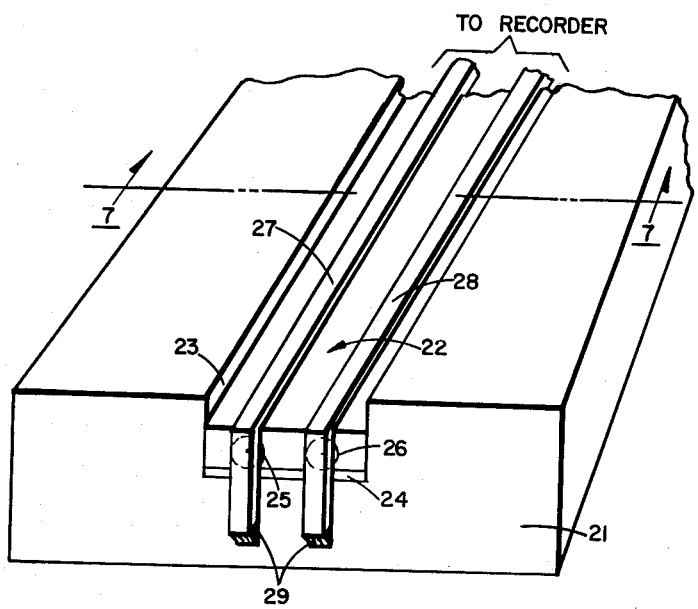
FIG. 6 is a partial perspective view disclosing a third weld backup bar assembly embodiment employing the novel concepts of this invention.
Figure 7:
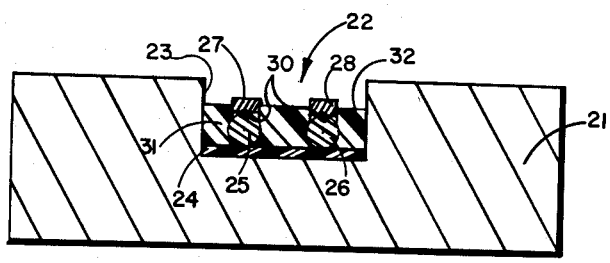
FIG. 7 is a cross-sectional view taken on lines 7—7 in FIG. 6.

FIGS. 6 and 7 disclose a third preferred weld backup bar assembly embodiment employing the novel concepts of this invention. A weld backup bar 21 has a longitudinally extending thermocouple means 22 constructed and arranged in a cutout portion or groove 23 which is formed therein. An insert 24 is constructed and arranged at the bottom most portion of the groove 23 and preferably comprises an electrically insulating constituent such as mica or the like. The insert member is also adapted to lend support thereat. Two substantially parallel rod-like members 25 and 26 are constructed and arranged in abutting relation with the insert 24 and provide a rigid support for the respective thermocouple members 27 and 28. The rods are shown as comprising a circular cross-section; however, any other desired cross-section may be utilized in lieu thereof. The rods may be constructed of any standard steel constituent, for example, which is capable of withstanding the particular weld temperatures.

The thermocouple members 27 and 28 may be secured to the weld backup bar 21 by means of spot weld 29 in a conventional manner, as clearly shown in FIG. 6. Also, a series of spot welds 30 (FIG. 7) may be selectively provided along the juxtaposed lengths of the rod members 25 and 26 and the respective thermocouple members 27 and 28 to provide a positive connection therebetween. The weld backup bar assembly is then completed by fabricating a standard cement electrical insulating type constituent 31 or the like around the other elements of the assembly to thus impart a supporting function thereto, as shown. The construction and arrangement of the thermocouple members 27 and 28 should be close enough together to permit sufficient weld underbead contact during the welding operation, but not too close to cause a shorting therebetween. Also, the thermocouple members are preferably constructed and arranged to have the top portions thereof exposed in cutout portion 23 at a sufficient distance above a top surface 32 of the electrical insulation material 31 to aid in the hereinbefore described bridging contact with the formed weld bead.

The weld backup bar embodiment of FIGS. 6 and 7 may be connected to a standard control system such as that shown in FIG. 3 and set into operation in a similar manner as that hereinbefore explained in connection with the embodiment of FIGS. 1–3 inclusive.

Figure 8:
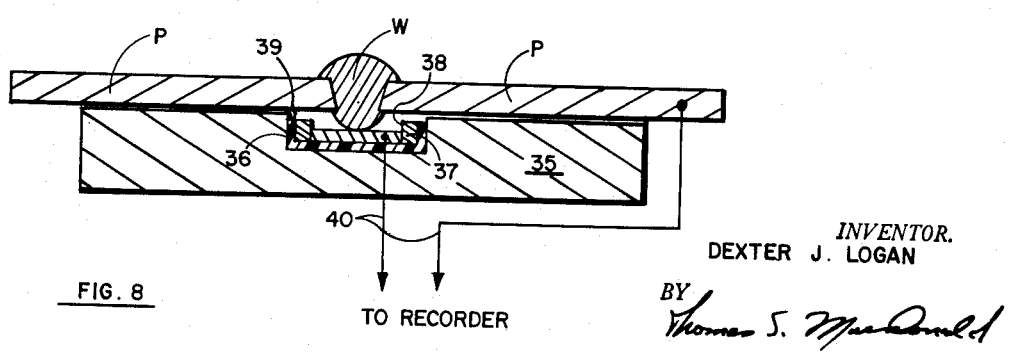
FIG. 8 is a cross-sectional view similar to FIG. 7, disclosing a fourth weld backup bar assembly embodiment.

FIG. 8 is a cross-sectional view, similar to FIG. 7, disclosing a fourth weld backup bar assembly embodiment. In conformance with the hereinbefore discussed novel concepts of this invention, a weld backup bar 35 having a cutout portion 36 therein is adapted to provide for the welding of workpieces P by means of a weld bead W. A longitudinally extending insert member 37 of the electrical conductive type is shown as comprising three pieces and is constructed and arranged within the cutout portion 36, as shown. The insert member 37 has a second grooved or cutout portion 38 which in turn provides an exposed surface portion providing for the hereinbefore discussed thermocouple function. The insert member is illustrated as comprising three pieces primarily for ease of installation purposes. It should be understood, however, that the insert may be constructed as a single piece, if so desired. An electrical insulation means 39 is constructed and arranged between the weld backup bar and the insert member 37 to prevent any disadvantageous electrical shorting therebetween. A clearance is thus provided, as shown, to prevent a shorting between the insert member 37 and the workpiece W.

As above stated, the insert member 37 is of the electrical conducting type such as copper and thus functions as a thermocouple means in substantially the same manner as that of the hereinbefore discussed embodiments. The main difference hereof is that the workpiece itself functions as one of the thermocouple members. The particular types of materials employed and the specific construction and arrangement therefor may be carried forth in conformance with the previous discussions. Thermocouple leads 40 are connected to the workpiece P and insert member 37 respectively, and may in turn be connected to the hereinbefore discussed recorder. Thus, the depth of weld joint W penetration may be continuously sensed in conformance with the above discussions.

Figure 9:
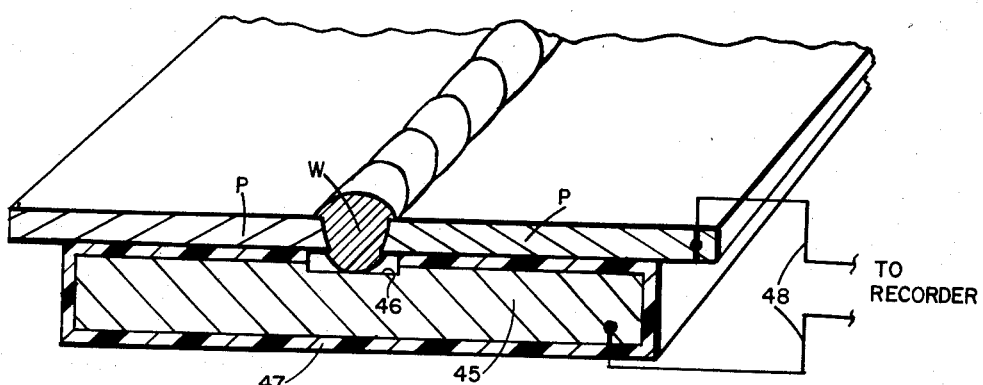
FIG. 9 is a partial perspective view disclosing a fifth weld backup bar assembly embodiment.

FIG. 9 discloses a fifth embodiment, also incorporating the novel concepts of this invention. This particular embodiment may be used in many suitable welding applications and is somewhat less complex in construction than the hereinbefore discussed embodiments. Therefore, a relatively large reduction in overall cost, including maintenance servicing, is made possible. In particular it should be noted that the illustrated weld backup bar 45 also provides a longitudinally extending cutout portion providing a second surface portion 46 therein formed at a fixed distance from the top or first surface portions of said weld backup bar. The surface portion 46 functions as a continuous thermocouple means in a like manner as hereinbefore explained in connection with the other described embodiments of this invention. An electrical insulative means 47 is constructed and arranged on the uppermost surface portions of the weld backup bar 45 which are juxtaposed to the workpieces P. The insulative means is also preferably constructed and arranged on all other surface portions of the weld backup bar except in the cutout portion. Thus, it is assured that the system will not be subjected to an electrical shorting due to contact with any adjacent electrically conductive type supporting structures. The surface portion 46 may be slightly recessed as shown, in conformance with the above discussions concerning the particular constructions and arrangements of the various weld backup bar assemblies. The surface portion 46, as well as the other hereinbefore discussed cooperating weld bead contact portions of the assembly, is preferably highly polished in construction to assure a precise contact thereat. Two thermocouple leads 48 are connected to the weld backup bar 45 and workpiece P in conformance with the above discussions. It should be further noted that the lead 48, shown as connected to the workpiece P, can be alternately connected to the welding gun in many applications. With such a construction and arrangement, the arc discharged between the welding gun and the workpiece can be utilized to complete the thermocouple circuit to the recorder.

The weld backup bar 45 may comprise copper, aluminum, steel or any other preferred electrical conducting type constituent, in conformance with the pertinent discussions hereinbefore set forth. It should be further understood that the insulative means 47 may comprise alumina or other similar hereinbefore discussed insulating material. However, it should be understood that when the embodiment of FIG. 9 is utilized for welding purposes that the particular workpiece P and weld backup bar combination should comprise dissimilar metallic materials which are of such a nature so as to provide for an efficient thermocouple function in conformance with the above discussions.

Although this invention has been described and illustrated in detail, it is to be understood that the same is by way of illustration and example only and is not to be taken by way of limitation, the spirit and scope of this invention being limited only by the terms of the appended claims. It should be further understood that the specific constructions and arrangements of any one of the individual hereinbefore set forth embodiments may be incorporated in whole or part in combination with one or more of the remaining embodiments. For example, in certain welding applications it may be desirable to directly connect one of the thermocouple leads of any one of the hereinbefore described embodiments to the welding gun, as suggested in the discussion of the embodiment shown in FIG. 9.

I claim:

1. A weld backup bar assembly adapted to aid in the formation of a weld joint penetration comprising a weld backup bar arranged to form a surface thereon onto which one or more welded workpieces are adapted to be supported and means formed on said weld backup bar at a predetermined distance from said surface and cooperating with the weld bead for thermoelectrically sensing and signaling said weld joint penetration.

2. A weld backup bar assembly adapted to aid in the formation of a weld point penetration comprising a weld backup bar arranged to form a surface thereon onto which one or more welded workpieces are adapted to be supported, means formed on said weld backup bar at a predetermined distance from said surface for aiding in the sensing of said weld joint penetration, and control means operatively connected to said weld backup bar assembly for continuously controlling the degree of heat input to said weld joint during the formation thereof.

3. A weld backup bar assembly for aiding in the forming of a weld joint penetration comprising a weld backup bar adapted to support one or more workpieces to be welded thereon and thermocouple sensing means on said weld backup bar and substantially extending the entire length thereof for contacting and continuously sensing said weld joint penetration.

4. A weld backup bar assembly for forming a weld bead comprising a weld backup bar forming a surface thereon, a cutout portion formed on said surface and extending into said weld backup bar, means formed in said cutout portion at a predetermined distance from said surface for contacting said weld bead and forming a thermocouple junction, and electrically insulative means formed on said weld backup bar assembly for electrically insulating said means from a workpiece which is to be supported and welded on said surface.

5. A weld backup bar assembly for forming a weld bead comprising a weld backup bar forming a surface thereon, a cutout portion formed on said surface and extending into said weld backup bar, means formed in said cutout portion at a predetermined distance from said surface for contacting said weld bead, insulative means formed on said weld backup bar assembly for electrically insulating said means from a workpiece which is to be supported and welded on said surface, and control means operatively connected to said weld backup bar assembly for continuously controlling the degree of heat input to said weld bead during the formation thereof.

6. A weld backup bar assembly adapted to aid in the formation of a weld bead pursuant to a complete weld joint penetration, said assembly comprising a weld backup bar having a cutout portion of predetermined length extending in a predetermined direction, said cutout portion formed on a surface thereof, two juxtaposed thermocouple members constructed and arranged in said cutout portion at a fixed distance from said surface and extending in said direction, said weld bead adapted to bridge said thermocouple members and electrical insulating means constructed and arranged on said weld backup bar for electrically insulating said thermocouple members therefrom.

7. A weld backup bar assembly adapted to aid in the formation of a weld bead pursuant to a complete weld joint penetration, said assembly comprising a weld backup bar having a cutout portion of predetermined length extending in a predetermined direction, said cutout portion formed on a surface thereof, said cutout portion forming a base portion having two substantially parallel grooves formed therein, said grooves extending in said direction, individual, thermocouple members constructed and arranged in juxtaposed relation to said grooves and at a fixed distance from the surface of said weld backup bar, said weld bead adapted to bridge said thermocouple members and electrical insulating means constructed and arranged in said grooves for electrically insulating said thermocouple members from said weld backup bar.

8. A weld backup bar assembly adapted to aid in the formation of a weld bead pursuant to a complete weld joint penetration, said assembly comprising a weld backup bar having a cutout portion of predetermined length extending in a predetermined direction, said cutout portion formed on a surface thereof, an insert member constructed and arranged in said cutout portion, said insert member forming a surface portion having two substantially parallel grooves formed therein, said grooves extending in said direction, individual thermocouple members constructed and arranged in juxtaposed relation to said grooves and at a fixed distance from the surface of said weld backup bar, said weld bead adapted to bridge said thermocouple members and electrical insulating means constructed and arranged in said grooves for electrically insulating said thermocouple members from said insert member.

9. A weld backup bar assembly adapted to aid in the formation of a weld bead pursuant to a complete weld joint penetration, said assembly comprising a weld back-up bar having a cutout portion of predetermined length extending in a predetermined direction, said cutout portion formed on a surface thereof, an insert member constructed and arranged in said cutout portion, two substantially parallel support members extending in said direction and arranged in abutting relation with said insert member, individual thermocouple members secured to said support members and arranged at a fixed distance from the surface of said weld backup bar, said weld bead adapted to bridge said thermocouple members and insulative means in said cutout portion in surrounding contact relationship with respect to said support members, said insulative means so constructed and arranged around said thermocouple members to provide that selected portions of said thermocouple members are exposed in said cutout portion to aid in a weld bead contact during the formation of said weld joint.

10. A weld backup bar assembly adapted to aid in the formation of a weld bead pursuant to a complete weld joint penetration, said assembly comprising a weld back-up bar having a cutout portion of predetermined length extending in a predetermined direction, said cutout portion formed on a surface thereof, an insert member comprising an electrical conducting constituent constructed and arranged in said cutout portion, said insert member providing a surface portion thereon which is exposed in said cutout portion at a fixed distance from the surface of said weld backup bar for thermoelectrically sensing temperature when contacted by said weld underbead during the formation of said weld joint and electrical insulative means constructed and arranged between said insert member and said weld backup bar.

11. A weld backup bar assembly adapted to aid in the formation of a weld bead pursuant to a complete weld joint penetration, said assembly comprising a weld backup bar having a cutout portion of predetermined length extending in a predetermined direction, said cutout portion formed on a surface thereof, an insert member comprising an electrical conducting constituent constructed and arranged in said cutout portion, said insert member providing a surface portion thereon which is exposed in said cutout portion at a fixed distance from the surface of said weld backup bar for providing a thermocouple function when contacted by said weld bead during the formation thereof, electrical insulative means constructed and arranged between said insert member and said weld backup bar, a first electrical lead means adapted to be connected to a workpiece to be welded, a second electrical lead means connected to said insert member, and control means operatively connected to said first and second electrical lead means for automatically controlling the degree of heat input to said weld joint during the formation thereof.

12. A weld backup bar assembly adapted to aid in the formation of a complete weld joint penetration comprising a weld backup bar having a cutout portion of predetermined length extending in a predetermined direction thereon, said cutout portion formed on a first surface portion thereof, said cutout portion constructed and arranged to form a second surface portion at a fixed distance from the first surface portion of said weld backup bar, insulative means constructed and arranged on said first surface portion of said weld backup bar, electrical lead means adapted to be connected to a workpiece to be welded and a second electrical lead means connected to said weld backup bar and control means operatively connected to said first and second electrical lead means for automatically controlling the degree of heat input to said weld point during the formation thereof.

References Cited in the file of this patent

UNITED STATES PATENTS

| | | |
|---|---|---|
| 1,679,702 | Wysong | Aug. 7, 1928 |
| 2,357,170 | Burggraf | Aug. 29, 1944 |